United States Patent [19]

Berthold et al.

[11] 4,448,944

[45] May 15, 1984

[54] PROCESS FOR THE PREPARATION OF A POLYOLEFIN, AND A CATALYST FOR THIS PROCESS

[75] Inventors: Joachim Berthold, Eppstein; Bernd Diedrich, Eschborn; Rainer Franke, Niedernhausen; Jürgen Hartlapp, Hattersheim am Main; Werner Schäfer; Wolfgang Strobel, both of Hofheim am Taunus, all of Fed. Rep. of Germany

[73] Assignee: Hoechst Aktiengesellschaft, Fed. Rep. of Germany

[21] Appl. No.: 388,022

[22] Filed: Jun. 14, 1982

[30] Foreign Application Priority Data

Jun. 20, 1981 [DE] Fed. Rep. of Germany ....... 3124222

[51] Int. Cl.$^3$ ........................... C08F 4/02; C08F 10/02
[52] U.S. Cl. .................................... 526/119; 502/152; 526/124; 526/125; 526/348.2; 526/348.5; 526/348.6; 526/901
[58] Field of Search ........................ 526/119, 124, 125

[56] References Cited

U.S. PATENT DOCUMENTS 3,644,318  2/1972  Diedrich et al. .................... 526/124
4,250,284  2/1981  Delbouille et al. ................. 526/124

FOREIGN PATENT DOCUMENTS 1154884  6/1969  United Kingdom ................ 526/119
1498862  1/1978  United Kingdom ................ 526/119

Primary Examiner—Edward J. Smith
Attorney, Agent, or Firm—Connolly and Hutz

[57] ABSTRACT

Polyolefins having a broad molecular weight distribution are obtained in a very high yield even using a catalyst based on a reaction product of a magnesium alcoholate with titanium tetrachloride, if the hydrocarbon-insoluble product of the reaction of the magnesium alcoholate with titanium tetrachloride is heated to a fairly high temperature with a chloroalkoxytitanate, in order to split off alkyl chlorides.

3 Claims, No Drawings

PROCESS FOR THE PREPARATION OF A POLYOLEFIN, AND A CATALYST FOR THIS PROCESS

Processes are known for the preparation of polyolefins by means of catalysts which are formed by reacting magnesium alcoholates and/or complex magnesium alcoholates with transition metal halides. (German Auslegeschriften Nos. 1,795,197 and 1,957,679 and German Offenlegungsschrift No. 2,000,566).

In one case, a temperature range of 0° to 200° C. is recommended for the reaction of the magnesium compound and the chlorine-containing titanium compound, but the upper temperature limit should be so chosen that no decomposition products are formed. In addition to the high activity of the polymerization catalysts, it is mentioned as a special advantage that it is possible to prepare ethylene homopolymers and ethylene/α-olefin copolymers which have a narrow molecular weight distribution (German Auslegeschriften Nos. 1,795,197 and 1,957,679).

In another case, the reaction of the metal alcoholate with the transition metal compound is carried out in the presence or absence of an inert diluent at temperatures of 40° to 210° C.; the duration of the reaction is, in general, between 5 and 240 minutes (German Offenlegungsschrift No. 2,000,566). An express warning is given against a longer reaction time, since it is alleged to cause an impairment in the properties of the catalyst. In this publication too, it is mentioned as an advantage of the catalysts that they have a high activity and that it is possible to prepare polyolefins which have a narrow molecular weight distribution. A catalyst which is obtained by reacting magnesium ethylate with vanadium tetrachloride and which produces a polyethylene having a broad molecular weight distribution is described at the same time. However, vanadium compounds have the great disadvantage that, in contrast with titanium compounds, they are extremely toxic. Products containing vanadium compounds can, therefore, only be employed to a limited extent. In addition, high costs are incurred in working up the catalyst mother liquors if vanadium compounds are employed in industrial polymerization processes.

The problem was therefore presented of finding polymerization catalysts based on a magnesium alcoholate, by means of which polyolefins having a broad molecular weight distribution can be prepared in a high yield.

It has now been found that polyolefins having a broad molecular weight distribution can be obtained in a very high yield even using a catalytic solid based on a magnesium alcoholate and tetravalent titanium compound, if the hydrocarbon-insoluble product of the reaction of the magnesium alcoholate with titanium tetrachloride is subjected to a heat treatment with a chloroalkoxytitanate at elevated temperatures, alkyl chlorides being split off.

The invention therefore relates to a process for the polymerization of 1-olefins of the formula $R^4CH=CH_2$ in which $R^4$ denotes hydrogen or an alkyl radical having 1 to 10 carbon atoms, in the presence of a catalyst composed of a component which contains magnesium and titanium (component A) and an organometallic compound of the Groups I to III of the periodic system (component B), which comprises carrying out the polymerization in the presence of a catalyst in which the component A has been prepared by a procedure in which, in a first reaction stage, a magnesium alcoholate is reacted with titanium tetrachloride in a hydrocarbon at a temperature of 50° to 100° C., the soluble constituents are then removed by washing with a hydrocarbon and the resulting solid is suspended in a hydrocarbon and is subjected, in a second reaction stage, with the addition of a chloroalkoxytitanate, to a heat treatment at a temperature of 110° to 200° C., until no further alkyl chloride is split off, and the solid is then freed from soluble reaction products by washing several times with a hydrocarbon.

The invention also relates, however, to the catalyst used for this process and to its preparation.

A magnesium alcoholate is used for the preparation of the component A. This magnesium alcoholate can be a "simple" magnesium alcoholate of the formula $Mg(OR)_2$ in which R denotes identical or different alkyl radicals having 1 to 6 carbon atoms. Examples are $Mg(OC_2H_5)_2$, $Mg(OiC_3H_7)_2$, $Mg(OnC_3H_7)_2$, $Mg(OnC_4H_9)_2$, $Mg(OCH_3)(OC_2H_5)$ and $Mg(OC_2H_5)(OnC_3H_7)$. It is also possible to use a "simple" magnesium alcoholate of the formula $Mg(OR)_nX_m$ in which X is halogen, $(SO_4)_{\frac{1}{2}}$, OH, $(CO_3)_{\frac{1}{2}}$, $(PO_4)_{\frac{1}{3}}$ and Cl, R has the meaning mentioned above and n+m is 2. It is also possible, however, to employ a "complex" magnesium alcoholate.

The term "complex" magnesium alcoholate describes a magnesium alcoholate which, as well as magnesium, contains at least one metal of the 1st to 4th main group of the periodic system. The following are examples of a complex magnesium alcoholate of this type: $[Mg(OiC_3H_7)_4]Li_2$; $[Al_2(OiC_3H_7)_8]Mg$; $[Si(OC_2H_5)_6]Mg$; $[Mg(OC_2H_5)_3]Na$; $[Al_2(OiC_4H_9)_8]Mg$; and $[Al_2(O-secC_4H_9)_6(OC_2H_5)_2]Mg$. The complex magnesium alcoholates(alkoxo salts) are prepared by known methods (literature references: Meerwein; Ann. 455 (1927), page 234, and 476 (1929), page 113; Houben-Weyl, Methoden der organischen Chemie ["Methods of organic chemistry"], volume 6/2, page 30). The following examples of the preparation of the complex magnesium alcoholate may be mentioned:

1. Two metal alcoholates are allowed to act on one another in a suitable solvent, for example

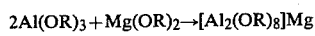

$$2Al(OR)_3 + Mg(OR)_2 \rightarrow [Al_2(OR)_8]Mg$$

2. Magnesium is dissolved in an alcoholic solution of a metal alcoholate

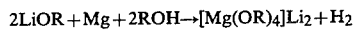

$$2LiOR + Mg + 2ROH \rightarrow [Mg(OR)_4]Li_2 + H_2$$

3. Two metals are dissolved in alcohol simultaneously

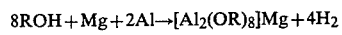

$$8ROH + Mg + 2Al \rightarrow [Al_2(OR)_8]Mg + 4H_2$$

The simple magnesium alcoholates, in particular $Mg(OC_2H_5)_2$, $Mg(OnC_3H_7)_2$ and $Mg(OiC_3H_7)_2$ are preferably used. The magnesium alcoholate is employed in a pure form or fixed on an inert support.

The preparation of the component A is effected in two reaction stages at different temperatures.

In the first reaction stage, the magnesium alcoholate is reacted with titanium tetrachloride at a temperature of 50° to 100° C., preferably 60° to 90° C., in the presence of an inert hydrocarbon and while stirring. 1 to 5 moles of titanium tetrachloride are employed for 1 mole of magnesium alcoholate, preferably 1.4 to 3.5 moles of titanium tetrachloride for 1 mole of magnesium alcoholate.

A suitable inert hydrocarbon is an aliphatic or cycloaliphatic hydrocarbon, such as butane, pentane, hexane, heptane, isooctane, cyclohexane or methylcyclohexane, and an aromatic hydrocarbon, such as toluene or xylene; it is also possible to use a hydrogenated diesel oil or gasoline fraction which has been carefully freed from oxygen, sulfur compounds and moisture.

The reaction time in the first stage is 0.5 to 8 hours, preferably 2 to 6 hours.

A substantial replacement of the alkoxy groups of the magnesium alcoholate by the chlorine groups of the titanium tetrachloride takes place in the first reaction stage. The reaction product obtained in this stage is a solid which is insoluble in hydrocarbons and contains magnesium and titanium, and which contains mainly magnesium chloride, and titanium compounds which are soluble in hydrocarbons and contain chlorine and alkoxy groups.

The hydrocarbon-insoluble product from the reaction of the magnesium alcoholate with titanium tetrachloride is then freed from unreacted, soluble titanium compounds by washing several times with an inert hydrocarbon.

The resulting solid is again suspended in a hydrocarbon and is subjected, in a second reaction stage, with the addition of a chloroalkoxytitanate, to a heat treatment at a temperature of 110° to 200° C., until no further alkyl chloride is split off.

As a rule, a reaction time of 1 to 100 hours is required for this.

The chloroalkoxy compound used is a compound of the formula $TiCl_n(OR^1)_{4-n}$, in which $R^1$ denotes identical or different alkyl radicals having 1 to 20 carbon atoms and n denotes 1 to 3.

The following are examples of chloroalkoxytitanates which can be used in accordance with the invention: $Ti(OC_2H_5)_3Cl$, $Ti(OC_2H_5)_2Cl_2$, $Ti(OC_2H_5)Cl_3$, $Ti(OC_3H_7)_3Cl$, $Ti(OiC_3H_7)_3Cl$, $Ti(OC_3H_7)_2Cl_2$, $Ti(OiC_3H_7)_2Cl_2$, $Ti(OC_3H_7)Cl_3$, $Ti(OiC_3H_7)Cl_3$, $Ti(OiC_4H_9)_2Cl_2$, $Ti(OC_8H_{17})Cl_3$ and $Ti(OC_{16}H_{33})Cl_3$.

It is preferable to use the following: $Ti(OC_2H_5)_2Cl_2$, $Ti(OC_2H_5)Cl_3$, $Ti(OC_3H_7)_2Cl_2$, $Ti(OC_3H_7)Cl_3$, $Ti(OiC_3H_7)_2Cl_2$ and $Ti(OiC_3H_7)Cl_3$.

0.1 to 3 molar parts of chloroalkoxytitanate are employed per molar part of magnesium alcoholate employed in the first reaction stage.

All the soluble reaction products are then removed by washing several times with a hydrocarbon, and a solid which is insoluble in the hydrocarbon and which contains magnesium and titanium, is obtained; this will be designated component A.

The polymerization catalyst to be used in accordance with the invention is prepared by bringing into contact with one another the component A and an organometallic compound of Groups I to III of the periodic system (component B).

It is preferable to use organoaluminum compounds as the component B. Suitable organoaluminum compounds are organoaluminum compounds containing chlorine, the dialkylaluminum monochlorides of the formula $R_2^2AlCl$ or the alkylaluminum sesquichlorides of the formula $R_3^2Al_2Cl_3$ in which $R^2$ can be identical or different alkyl radicals having 1 to 16 carbon atoms. The following may be mentioned as examples: $(C_2H_5)_2AlCl$, $(iC_4H_9)_2AlCl$ and $(C_2H_5)_3Al_2Cl_3$.

It is particularly preferable to employ chlorine-free compounds as the organoaluminum compounds. Compounds suitable for this purpose are, firstly, the products from the reaction of aluminum trialkyls or aluminum dialkylhydrides with hydrocarbon radicals having 1 to 6 carbon atoms, preferably the reaction of Al(iC$_4$H$_9$)$_3$ or Al(iC$_4$H$_9$)$_2$H with diolefins containing 4 to 20 carbon atoms, preferably isoprene. Aluminum isoprenyl may be mentioned as an example.

Secondly, chlorine-free organoaluminum compounds of this type are aluminum trialkyls $AlR_3^3$ or aluminum dialkylhydrides of the formula $AlR_2^3H$ in which $R^3$ denotes identical or different alkyl radicals having 1 to 16 carbon atoms. Examples are $Al(C_2H_5)_3$, $Al(C_2H_5)_2H$, $Al(C_3H_7)_3$, $Al(C_3H_7)_2H$, $Al(iC_4H_9)_3$, $Al(iC_4H_9)_2H$, $Al(C_8H_{17})_3$, $Al(C_{12}H_{25})_3$, $Al(C_2H_5)(C_{12}H_{25})_2$ and $Al(iC_4H_9)(C_{12}H_{25})_2$.

It is also possible to employ mixtures of organometallic compounds of the I to III Group of the periodic system, particularly mixtures of different organoaluminum compounds. The following mixtures may be mentioned as examples: $Al(C_2H_5)_3$ and $Al(iC_4H_9)_3$, $Al(C_2H_5)_2Cl$ and the like.

The polymerization is carried out in a known manner in solution, in suspension or in the gas phase, continuously or discontinuously, in a single stage or in several stages and at a temperature of 20° to 200° C., preferably 50° to 150° C. The pressure is 0.5 to 50 bar. Polymerization within the pressure range from 5 to 30 bar, which is of particular interest in industry, is preferred.

In this polymerization, the component A is used in a concentration, calculated as titanium, of 0.0001 to 1, preferably 0.001 to 0.5, mmole of Ti per liter of dispersion medium or per liter of reactor volume. The organometallic compound is used in a concentration of 0.1 to 5 mmoles, preferably 0.5 to 4 mmoles, per liter of dispersion medium or per liter of reactor volume. In principle, however, higher concentrations are also possible.

Suspension polymerization is carried out in an inert dispersion medium which is customary for the Ziegler low-pressure process, for example in an aliphatic or cycloaliphatic hydrocarbon; butane, pentane, hexane, heptane, isooctane, cyclohexane or methylcyclohexane may be mentioned as examples of such a hydrocarbon. It is also possible to use a gasoline or hydrogenated diesel oil fraction which has been carefully freed from oxygen, sulfur compounds and moisture. The molecular weight of the polymer is regulated in a known manner; it is preferable to use hydrogen for this purpose.

As a result of the high activity of the catalyst to be used, the process according to the invention produces polymers having a very low content of titanium and halogen and, therefore, extremely good values in the test for color stability and corrosion. It also makes it possible to prepare polymers having a very broad molecular weight distribution; the Mw/Mn values of the polymers are over 10.

A further decisive advantage of the process according to the invention can be seen in the fact that it makes it possible to prepare polymers having molecular weights which differ very greatly, merely by varying the concentration of hydrogen. For example, polymers having molecular weights above 2 million are formed in a polymerization in the absence of hydrogen, and polymers having molecular weights in the region of 30,000 are formed at hydrogen contents of 70% by volume in the gas space.

The polymers can be fabricated at high throughput rates by the extrusion and blow-extrusion process to give hollow articles, tubes, cables and films which have smooth surfaces.

By virtue of a special structural composition, the hollow articles and bottles produced from the polyolefins obtained in accordance with the invention are distinguished by a considerable lack of sensitivity to stress cracking.

Furthermore, the process according to the invention makes it possible to prepare, by suspension and gas phase polymerization, free-flowing polymer powders having high bulk densities, so that they can be processed further directly to give shaped articles without a granulation stage.

EXAMPLES

In the examples which follow, a hydrogenated diesel oil fraction having a boiling range of 130° to 170° C. is used for the preparation of the catalyst and for the polymerization.

The titanium content of the catalysts is determined colorimetrically (literature reference: G. O. Müller, Praktikum der quantitativen chemischen Analyse ["Practical manual of quantitative chemical analysis"], 4th edition (1957), page 243).

The melt index MFI is determined as specified in DIN 53,735 (E).

The Mw/Mn values are determined from the fractionation data of a gel permeation chromatograph at 130° C., using 1,2,4-trichlorobenzene as the solvent and extraction medium.

The intrinsic viscosity is determined as specified in DIN 53,728, sheet 4, using an Ubbelohde viscometer, with decahydronaphthalene as the solvent.

The density is determined as specified in DIN 53,479 and the bulk density as specified in DIN 53,468.

EXAMPLE 1

(a) Preparation of the component A 228.6 g of magnesium ethylate were dispersed, under a blanket of $N_2$, in 2.5 l of a diesel oil fraction in a 4 l four-necked flask equipped with a dropping funnel, a KPG stirrer, a reflux condenser and a thermometer. 760 g of titanium tetrachloride were added dropwise at 90° C. to this dispersion in the course of 5 hours. The reaction product was then washed with the diesel oil fraction until the supernatant solution no longer contained any titanium.

After drying, the solid from the first reaction stage had the following analytical composition:
Ti: 3.7% by weight
Mg: 21.2% by weight
Cl: 64.5% by weight.

The whole of the solid was dispersed again, under a blanket of $N_2$, in 1.5 l of the diesel oil fraction in a 4 l four-necked flask equipped with a dropping funnel, a KPG stirrer, a reflux condenser and a thermometer. 598 g of $Ti(OC_2H_5)Cl_3$ in 0.5 l of the diesel oil fraction were added to this dispersion at 120° C. in the course of 15 minutes and the batch was then stirred for 70 hours at this temperature.

A gentle stream of $N_2$ was passed over the reaction mixture during the whole reaction time in order to expel gaseous reaction products, and this stream was then passed through a cold trap cooled with methanol/solid carbon dioxide. The evolution of gaseous reaction products was complete after 60 hours. 148 g of a water-white liquid of the following composition:
Cl: 55% by weight
C: 37% by weight
H: 8% by weight
were collected in the cold trap. This was ethyl chloride. The reaction product was then washed with the diesel oil fraction until the supernatant solution no longer contained any titanium.

After drying, the solid (component A) had the following analytical composition:
Ti: 24.3% by weight
Mg: 9.7% by weight
Cl: 49.4% by weight.
The Cl:Ti atomic ratio was 2.74.

(b) Pre-activation of the component A 25.6 g of the component A were suspended in 300 ml of diesel oil, and 100 ml of an aluminum isoprenyl solution containing 1 mole of aluminum isoprenyl per 1 l were added at 20° C., while stirring. 19.2% by weight of the tetravalent titanium was reduced to titanium-(III) by this means.

(c) Polymerization of ethylene in suspension 100 l of diesel oil, 200 mmoles of aluminum isoprenyl and 8.8 ml of the dispersion described under (b) were charged to a 150 l kettle. 5 kg per hour of ethylene and sufficient $H_2$ to give an $H_2$ content of 55% by volume in the gas space were then passed in at a polymerization temperature of 85° C. After 6 hours the polymerization was terminated at a pressure of 24.2 bar, by releasing the pressure. The suspension was filtered and the polyethylene powder was dried by passing hot nitrogen over it.

29.6 kg of polyethylene were obtained. This corresponds to a catalyst activity of 52.6 kg of polyethylene/g of catalyst solid (component A) or 10.4 kg of polyethylene/mmole of Ti. The polyethylene powder had an MFI 190/5 of 0.82 g/10 minutes. The breadth of molecular weight distribution Mw/Mn was 18 and the MFI 190/15/MFI 190/5 was 9.8. The density of the powder was 0.956 g/cm³ and its bulk density was 0.43 g/cm³.

EXAMPLE 2

Polymerization of ethylene in suspension 150 mmoles of aluminum triisobutyl and 2.4 ml of the dispersion described in Example 1(b) were charged to the kettle under the same conditions as those described in Example 1(c).

5 kg per hour of ethylene were then passed in at a polymerization temperature of 75° C. After 6 hours the polymerization was terminated at a pressure of 23.2 bar, by releasing the pressure. The suspension was filtered and the polyethylene powder was dried by passing hot nitrogen over it. 28.3 kg of polyethylene were obtained. This corresponds to a catalyst activity of 184 kg of polyethylene/g of catalyst solid or 36.3 kg of polyethylene/mmole of Ti. The polyethylene powder had an intrinsic viscosity of 2,100 ml/g; this corresponds to a molecular weight of 1.9 million. The bulk density was 0.47 g/cm³.

EXAMPLE 3

Polymerization of ethylene in suspension 200 mmoles of diisobutylaluminum hydride and 33.4 ml of the dispersion described in Example 1(b) were charged to the kettle under the same conditions as those described in Example 1(c). 4 kg per hour of ethylene and sufficient $H_2$ to give an $H_2$ content of 75% by volume in the gas space were then passed in at a polymerization temperature of 85° C. After 6 hours the polymerization was terminated at a pressure of 23.7 bar, by releasing the pressure. The suspension was filtered and the polyethylene powder was dried by passing hot nitrogen over it. 22.8 kg of polyethylene were isolated. This corresponds to a catalyst yield of 10.7 kg of polyethylene/g of catalyst solid or 2.1 kg of polyethylene/mmole of Ti. The polyethylene had an MFI 190/5 of 88 g/10 minutes, an intrinsic viscosity of 112 ml/g, a density of 0.964 g/cm$^3$ and a bulk density of 0.48 g/cm$^3$. The breadth of molecular weight distribution Mw/Mn was 23.

EXAMPLE 4

Copolymerization of ethylene and 1-butene in suspension 100 l of hexane, 150 mmoles of aluminum isoprenyl and 14.7 ml of the dispersion described in Example 1(b) were initially taken in a 150 l kettle. 5 kg/hour of ethylene, 0.5 l/hour of 1-butene and sufficient H$_2$ to set up an H$_2$ content of 50% by volume in the gas space were then passed in at a polymerization temperature of 85° C.

After 6 hours the polymerization was terminated at a polymerization pressure of 7.8 bar. The polymer powder was isolated by filtration and dried with hot nitrogen. 30.6 kg of polymer were obtained. This corresponds to a catalyst yield of 32.6 kg of polymer/g of catalyst solid or 6.4 kg of polymer/mmole of Ti.

The ethylene/1-butene copolymer had an MFI 190/5 of 0.68 g/10 minutes, an MFI 190/15/MFI 190/5 ratio of 9.3, a density of 0.943 g/cm$^3$ and a bulk density of 0.41 g/cm$^3$.

EXAMPLE 5

Copolymerization of ethylene and 1-octene in suspension 750 ml of hexane, 5 mmoles of aluminum triethyl and 1.8 mg of the component A (Example 1a) were charged to a 1.5 l steel autoclave. H$_2$ was then injected at 8 bar, and ethylene at 15 bar, at a polymerization temperature of 85° C. The ethylene was passed in at such a rate that a total pressure of 23 bar was maintained. 25 ml per hour of 1-octene were metered in at the same time. The experiment was discontinued after 4 hours. The copolymer was isolated by filtration and dried in a vacuum, drying cabinet. 104 g of polymer were obtained. This corresponds to a catalyst yield of 57.8 kg of polymer/g of catalyst solid or 11.4 kg of polymer/mmole of Ti. The ethylene/1-octene copolymer had a melt index MFI 190/5 of 0.47 g/10 minutes and a density of 0.949 g/cm$^3$.

EXAMPLE 6

Polymerization of ethylene in the gas phase 500 g of polyethylene powder (MFI 190/5 = 1.6 g/10 minutes, bulk density = 0.43 g/cm$^3$ and density = 0.925 g/cm$^3$) were initially taken in a 20 l horizontal reactor equipped with a stirrer working close to the wall. The reactor was freed from air by being evacuated several times and flushed with ethylene for several hours, and was then warmed to 85° C. 50 mmoles of aluminum triethyl and 51.7 mg of the catalyst component prepared in Example 1(a) were charged to the reactor.

350 g/hour of ethylene, 80 g/hour of 1-butene and sufficient hydrogen to keep the proportion of hydrogen at 30% by volume during the polymerization were passed in. The pressure rose to 19 bar in the course of the reaction. The polymerization was discontinued after 6 hours. 3.0 kg of polymer having an MFI 190/5 of 0.95 g/10 minutes, a density of 0.921 g/cm$^3$ and a bulk density of 0.44 g/cm$^3$ were obtained. This corresponds to a catalyst yield of 48.4 kg of polyethylene/g of catalyst solid or 9.5 kg of polyethylene/mmole of Ti.

EXAMPLE 7

Copolymerization of ethylene and 1-hexene in suspension 360 l of diesel oil, 540 ml of aluminum isoprenyl and 53 ml of the catalyst dispersion described in Example 1(b) were initially taken in a 500 l kettle. 18 kg/hour of ethylene, 2 l/hour of 1-hexene and sufficient H$_2$ to set up an H$_2$ content of 47% by volume in the gas space were passed in at a polymerization temperature of 85° C.

After 6 hours the polymerization was terminated at a polymerization pressure of 8.5 bar, by releasing the pressure. The suspension was cooled to room temperature and the solid was isolated by filtration and dried with hot N$_2$. 110.8 kg of product having an MFI 190/5 of 1.1 g/10 minutes, an MFI 190/15/MFI 190/5 of 9.5, a density of 0.946 g/cm$^3$ and a bulk density of 0.42 g/cm$^3$ were obtained. This corresponds to a catalyst yield of 32.7 kg of copolymer/g of catalyst solid or 6.4 kg of copolymer/mmole of Ti.

Bottles were produced from the powder on a blow-molding apparatus for hollow articles (extruder screw: D = 60 mm). A very high output of 59 kg/hour was obtained at a screw speed of 40 r.p.m. The bottles had a very smooth surface and a very high resistance to stress cracking, 960 hours, in the Bell stress cracking test.

Comparison Example A (a) Preparation of the component A 228.6 g of magnesium ethylate were dispersed, under a blanket of N$_2$, in 2.5 l of a diesel oil fraction in a 4 l four-necked flask equipped with a dropping funnel, a KPG stirrer, a reflux condenser and a thermometer. 760 g of titanium tetrachloride were added dropwise at 90° C. to this dispersion, in the course of 5 hours, while passing a gentle stream of N$_2$ through the flask. The reaction product was then washed with the diesel oil fraction until the supernatant solution no longer contained any titanium. After drying, the solid (component A) had the following analytical composition:

Ti: 3.7% by weight
Mg: 21.2% by weight
Cl: 64.5% by weight.

(b) Pre-activation of the component A 25.6 g of the component A were made up to 300 ml with diesel oil, and 100 ml of a solution of aluminum isoprenyl in diesel oil containing 1 mole of aluminum isoprenyl per 1 l of solution was added at 20° C., while stirring. 39% by weight of the tetravalent titanium was reduced to titanium-(III) by this means.

(c) Polymerization of ethylene in suspension 360 l of hexane, 540 mmoles of aluminum isoprenyl and 247 g of the catalyst component described under (a) were charged to a 500 l kettle. 18 kg per hour of ethylene and sufficient H$_2$ to give an H$_2$ content of 40% by volume in the gas space were then passed in at 85° C. After 6 hours the polymerization was discontinued at a pressure of 5.2 bar, by releasing the pressure. 105.1 kg of polyethylene were obtained. This corresponds to a catalyst yield of 6.6 kg/g of catalyst solid or 8.6 kg of polyethylene/mmole of Ti.

The product had an MFI 190/5 of 1.3 g/10 minutes, an MFI 190/15/MFI 190/5 of 5.6, a density of 0.955 g/cm$^3$ and a bulk density of 0.44 g/cm$^3$. The product had a narrow molecular weight distribution: Mw/Mn=5.4.

An output of 41 kg/hour was obtained when the powder was processed on a blow-molding apparatus for hollow articles (extruder screw: D=60 mm) at a screw speed of 40 r.p.m. The bottles had a rough surface, since melt furnace occurred when they were processed. The resistance to stress cracking of the bottles in the Bell test was 54 hours.

(d) Polymerization of ethylene in suspension 100 l of diesel oil, 200 mmoles of aluminum isoprenyl and 84 ml of the dispersion described under (b) were charged to a 150 l kettle. 5 kg per hour of ethylene and sufficient H$_2$ to give an H$_2$ content of 55% by volume in the gas space were then passed in at a polymerization temperature of 85° C. After 6 hours the polymerization was terminated at a pressure of 23.5 bar by releasing the pressure. The suspension was filtered and the polyethylene powder was dried by passing hot nitrogen over it.

28.7 kg of polyethylene were obtained. This corresponds to a catalyst activity of 5.3 kg of polyethylene/catalyst solid or 6.9 kg of polyethylene/mmole of titanium.

The product had an MFI 190/5 of 7.8 g/10 minutes, an MFI 190/15/MFI 190/5 value of 5.4 and a bulk density of 0.44 g/cm$^3$. The product had a narrow molecular weight distribution: Mw/Mn=4.9.

EXAMPLE 8

(a) Preparation of the component A 228.6 g of magnesium ethylate were dispersed, under a blanket of N$_2$, in 2.5 l of a diesel oil fraction in a 4 l four-necked flask equipped with a dropping funnel, a KPG stirrer, a reflux condenser and a thermometer. 532 g of titanium tetrachloride were added dropwise at 80° C. to this dispersion in the course of 4 hours.

The reaction product was then washed with the diesel oil fraction until the supernatant solution no longer contained any titanium.

After drying, the solid from the first reaction stage had the following analytical composition:
Ti: 7.3% by weight
Mg: 17.0% by weight
Cl: 55.0% by weight.

The whole of the solid was dispersed, under a blanket of N$_2$, in 1.5 l of the diesel oil fraction in a 4 l four-necked flask equipped with a dropping funnel, a KPG stirrer, a reflux condenser and a thermometer. 568 g of Ti(OC$_3$H$_7$)$_2$Cl$_2$ in 0.5 l of the diesel oil fraction were added to this dispersion at 150° C. in the course of 15 minutes and the mixture was then stirred for 18 hours at this temperature.

A gentle stream of N$_2$ was passed over the reaction mixture during the whole reaction time in order to expel gaseous reaction products, and this stream was passed through a cold trap cooled with methanol/solid carbon dioxide. The liberation of gaseous reaction products was complete after 18 hours. 249 g of a water-white liquid of the following composition were collected in the cold trap:
Cl: 45% by weight
C: 46% by weight
H: 9% by weight.
This was propyl chloride.

The reaction product was then washed with the diesel oil fraction until the supernatant solution no longer contained any titanium.

After drying, the solid (component A) contained the following:
Ti: 22.3% by weight
Mg: 10.1% by weight
Cl: 45.3% by weight.
The Cl:Ti atomic ratio was 2.70.

(b) Pre-activation of the component A 28.3 g of the component A were made up to 300 ml with diesel oil, and 100 ml of an aluminum triisobutyl solution containing 1 mole of Al(iC$_4$H$_9$)$_3$ per 1 l were added at 20° C., while stirring. 33% by weight of the tetravalent titanium were reduced to titanium-(III) by this means.

(c) Polymerization of ethylene in suspension 100 l of diesel oil, 50 mmoles of aluminum triisobutyl and 6.2 ml of the dispersion described under (b) were charged to a 150 l kettle. 5 kg per hour of ethylene and sufficient H$_2$ to give an H$_2$ content of 30% by volume in the gas space were then passed in at a polymerization temperature of 85° C. After 6 hours the polymerization was terminated at a pressure of 24.1 bar by releasing the pressure. The suspension was filtered and the polyethylene powder was dried by passing hot nitrogen over it. 28.2 kg of polyethylene were obtained. This corresponds to a catalyst activity of 64.3 kg of polyethylene/g of catalyst solid or 13.9 kg of polyethylene/mmole of Ti. The polyethylene powder had an MFI 190/5 of 0.29 g/10 minutes. The breadth of molecular weight distribution Mw/Mn was 19 and the MFI 190/15/MFI 190/5 was 10.3. The density of the powder was 0.950 g/cm$^3$ and its bulk density was 0.43 g/cm$^3$.

EXAMPLE 9

(a) Preparation of the component A 142.3 g of magnesium isopropylate were dispersed, under a blanket of N$_2$, in 1.0 l of the diesel oil fraction in a 3 l four-necked flask equipped with a dropping funnel, a KPG stirrer, a reflux condenser and a thermometer. 332 g of titanium tetrachloride were added dropwise at 65° C. to this dispersion in the course of 4 hours.

The reaction product was then washed with the diesel oil fraction until the supernatant solution no longer contained any titanium.

After drying, the solid from the first reaction stage had the following analytical composition:
Ti: 7.6% by weight
Mg: 14.9% by weight
Cl: 49.2% by weight.

The whole of the solid was dispersed, under a blanket of N$_2$, in 0.75 l of the diesel oil fraction in a 3 l four-necked flask equipped with a dropping funnel, a KPG stirrer, a reflux condenser and a thermometer. 470 g of Ti(OiC$_3$H$_7$)Cl$_3$ in 0.5 l of this diesel oil fraction were added at 115° C. to this dispersion in the course of 15 minutes, and the mixture was then stirred for 40 hours at this temperature.

A gentle stream of N$_2$ was passed over the reaction mixture during the whole reaction time in order to expel gaseous reaction products, and this stream was passed through a cold trap cooled with methanol/solid carbon dioxide. The evolution of gaseous reaction products was complete after 40 hours. 153 g of a water-white liquid of the following composition were collected in the cold trap:
Cl: 45.5% by weight C: 46.2% by weight
H: 9% by weight.
This was isopropyl chloride.

The reaction product was then washed with the diesel oil fraction mentioned above until the supernatant solution no longer contained any titanium.

After drying, the solid (component A) had the following analytical composition:
Ti: 27.7% by weight
Mg: 8.2% by weight
Cl: 44.4% by weight.
The Cl:Ti atomic ratio was 2.2.

(b) Copolymerization of ethylene and 1-butene in suspension 100 l of diesel oil, 80 mmoles of aluminum triisobutyl and 846 mg of the catalyst solid described under (a) were charged to a 150 l kettle. 5 kg per hour of ethylene, 0.5 l/hour of 1-butene and sufficient $H_2$ to give an $H_2$ content of 45% by volume in the gas space were then passed in at a polymerization temperature of 85° C. After 6 hours the polymerization was terminated at a pressure of 22.3 bar by releasing the pressure. The suspension was filtered and the copolymer powder was dried by passing hot nitrogen over it.

28.7 kg of product were obtained. This corresponds to a catalyst activity of 34 kg of copolymer/g of catalyst solid or 5.9 kg of copolymer/mmole of Ti. The copolymer powder had an MFI 190/5 of 0.48 g/10 minutes. The breadth of molecular weight distribution Mw/Mn was 23 and the MFI 190/15/MFI 190/5 was 9.9. The density of the powder was 0.948 g/cm$^3$ and its bulk density was 0.38 g/cm$^3$.

We claim:

1. A process for the polymerization of ethylene alone or in combination with a minor amount of a 1-olefin of the formula $R^4$-CH=CH$_2$ in which $R^4$ denotes an alkyl radical having 1 to 10 carbon atoms, in the presence of a catalyst comprised of a component which contains magnesium and titanium (component A) and an organometallic compound of the Groups I to III of the periodic system (component B), which comprises carrying out the polymerization in the presence of a catalyst in which the component A has been prepared by a procedure in which, in a first reaction stage, a magnesium alcoholate of the formula Mg(OR)$_2$, wherein R represents identical or different alkyl radicals having from 1 to 6 carbon atoms, is reacted with titanium tetrachloride in a hydrocarbon at a temperature of 50° to 100° C., 1 to 5 moles of titanium tetrachloride per mole of magnesium alcoholate being employed, the soluble constituents are then removed by washing with a hydrocarbon and the resulting solid is suspended in a hydrocarbon and is subjected, in a second reaction stage, with the addition of 0.1 to 3 moles chloroalkoxytitanate per mole of magnesium alcoholate, to a heat treatment for 10 to 100 hours at a temperature of 110° to 200° C., with evolution of alkyl chloride, until no further alkyl chloride is split off, and the solid is then freed from soluble reaction products by washing several times with a hydrocarbon.

2. The process as claimed in claim 1, wherein the component A is prepared in a first reaction stage by reacting a magnesium alcoholate with titanium tetrachloride in a hydrocarbon at a temperature of 50° to 100° C., then removing the soluble constituents by washing with a hydrocarbon, and suspending the resulting solid in a hydrocarbon and subjecting it, in a second reaction stage, with the additiion of a chloroalkoxytitanate of the formula TiCl$_n$(OR$^1$)$_{4-n}$, in which R$^1$ denotes identical or different alkyl radicals having 1 to 20 carbon atoms and n denotes 1 to 3, to a heat treatment at a temperature of 110° to 200° C. until no further alkyl chloride is split off, and then freeing the solid from soluble reaction products by washing it several times with a hydrocarbon.

3. A process as claimed in claim 1, wherein the resulting polyethylene or ethylene/1-olefin copolymer has an Mn/Mn value greater than 10.

* * * * *